E. J. WILLIAMS.
SPLICING TOOL.
APPLICATION FILED AUG. 21, 1920.
1,422,803.
Patented July 11, 1922.
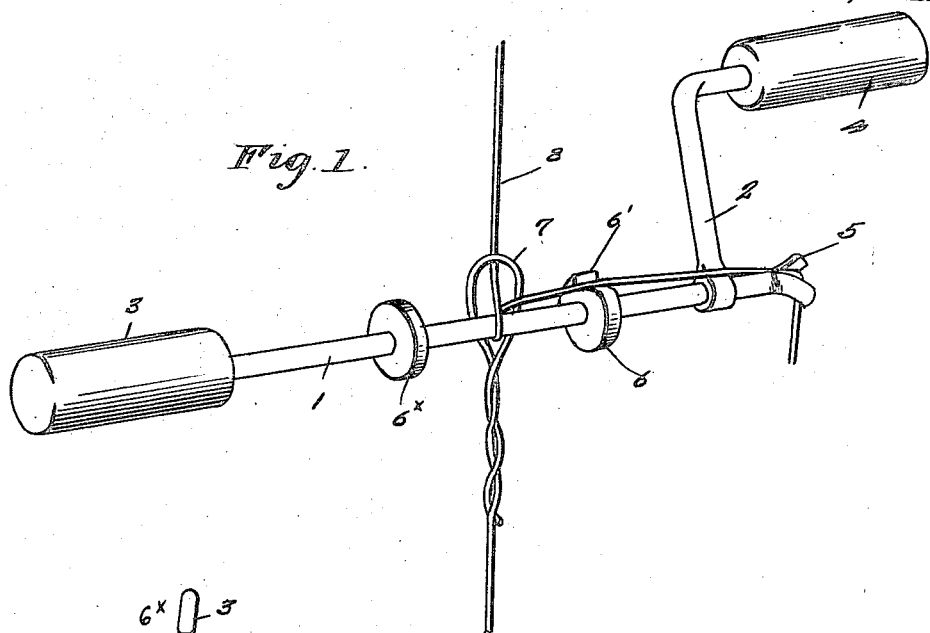
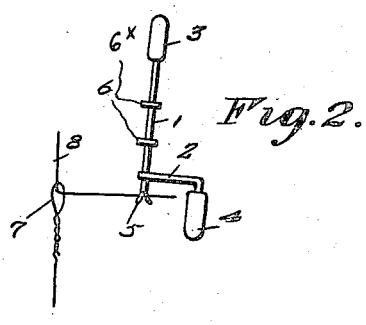
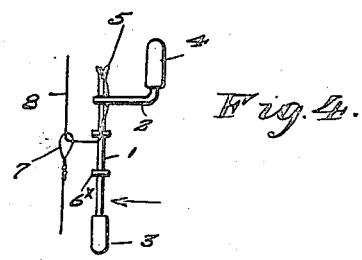
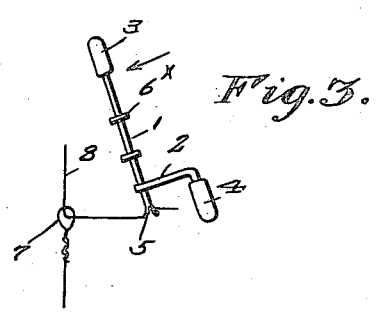
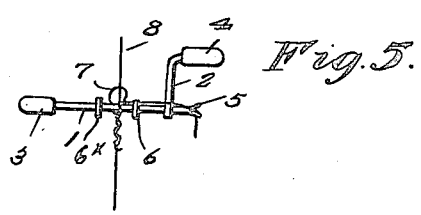
E. J. Williams
INVENTOR
BY Victor J. Evans
ATTORNEY

UNITED STATES PATENT OFFICE.

EARL J. WILLIAMS, OF GEARY, OKLAHOMA.

SPLICING TOOL.

1,422,803.   Specification of Letters Patent.   Patented July 11, 1922.

Application filed August 21, 1920. Serial No. 405,033.

*To all whom it may concern:*

Be it known that I, EARL J. WILLIAMS, a citizen of the United States, residing at Geary, in the county of Blaine and State of Oklahoma, have invented new and useful Improvements in Splicing Tools, of which the following is a specification.

This invention relates to a splicing tool and stretcher for wire fences and the like, the principal object of the invention being to provide a simple device whereby the fence wire can be spliced and stretched very easily and quickly.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a perspective view of the tool.

Figures 2, 3, 4 and 5 are views showing how the tool is used.

In these views 1 indicates a shaft having a crank 2 adjacent one end thereof and a handle 3 at its other end. A handle 4 is secured to the end of the crank. A claw 5 is formed on the extended end of the shaft which extends beyond the crank 2. Collars 6 and 6× are formed on the shaft and the collar 6 adjacent the crank is provided with an upwardly extending lug 6'. The wire is to be wound between the collars, these collars with a part of the shaft acting as a reel for the wire.

In using the device a loop 7 is formed on one end of the wire to be spliced and the end of the other wire 8 is passed through this loop and placed in the claw as shown in Figure 2. The device is then swung in the direction of the arrow in Figure 3 until it assumes the position shown in Figure 4 where the shaft is parallel with the wires and the end part of wire 8 extends along the shaft and bears against the crank 2 and the lug 6'. This lug is to serve the purpose of holding the end part of the wire 8 parallel with the shaft, as shown in Figures 1, 4, and 5, while this part of the wire is being pressed upon by the crank 2. From the position shown in Figure 4 the device is then moved to the position shown in Figure 5 with the reel part of the device extending across the loop 7. As will be seen from Figure 1 the wire 8 is given a part turn around the reel part of the shaft so that when the device is turned towards the operator by his hands grasping the handles 3 and 4 the pressure of crank 2 on the part of wire 8 between the collar 6 and claw 5 will wrap wire 8 upon the reel part of the shaft and thus take the slack out of the wire. After the wire has been stretched to a sufficient degree the device is pushed over and beyond the loop 7 to form a loop in the wire 8 to hold the two wires together and then the device is rotated in the opposite direction to unroll the wire 8 therefrom. The wire 8 is then twisted to form a permanent loop and thus securely connect the two wires together. It will of course be understood that if the two wires are not long enough to be connected together a short piece of wire is connected to the one piece and then the other end of this short piece is fastened to the other wire as above described.

It will thus be seen that the fence wire can be easily and quickly repaired between posts and by a single person.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a shaft having a crank at one end and a handle at the other end, a reel in the center and a claw formed on said shaft.

2. A device of the class described comprising a shaft having a crank at one end and a handle at the other end, a claw formed on the shaft and extending beyond the crank end thereof and collars on the shaft forming a reel, one of said collars having a projection thereon.

In testimony whereof I affix my signature.

EARL J. WILLIAMS.